United States Patent [19]
Bohme

[11] Patent Number: 4,628,630
[45] Date of Patent: Dec. 16, 1986

[54] DEEP TROLLING RELEASE DEVICE

[76] Inventor: Edward A. Bohme, 5759 Larson Pl., West Vancouver, British Columbia, Canada, V7W 1S5

[21] Appl. No.: 794,435

[22] Filed: Nov. 4, 1985

Related U.S. Application Data

[63] Continuation-in-part of Ser. No. 532,370, Sep. 15, 1983, Pat. No. 4,565,026.

[51] Int. Cl.$^4$ .............................................. A01K 91/06
[52] U.S. Cl. ................................. 43/43.12; 43/44.93; 24/115 M; 24/136 K; 24/136 L
[58] Field of Search .................. 43/43.12, 17.2, 44.93; 24/115 F, 115 G, 115 M, 136 R, 136 K, 136 L

[56] References Cited

U.S. PATENT DOCUMENTS

| | | | |
|---|---|---|---|
| 1,296,370 | 3/1919 | Darling | 43/43.12 |
| 2,359,588 | 10/1944 | Shea | 43/43.12 |
| 2,562,054 | 7/1951 | Mathieu | 43/43.12 |
| 3,619,932 | 11/1971 | Maxwell | 43/43.12 |
| 3,765,118 | 10/1973 | Reitler | 43/43.12 |
| 3,925,920 | 12/1975 | Walker | 43/43.12 |
| 4,031,652 | 6/1977 | Johnson | 43/43.12 |
| 4,177,599 | 12/1979 | Petterson | 43/43.12 |

Primary Examiner—Nicholas P. Godici
Assistant Examiner—Christopher L. McKee
Attorney, Agent, or Firm—Carver & Co.

[57] ABSTRACT

A deep trolling release device releasably connects a fishing line to a downrigger line. A hollow outer member is connectable to the downrigger line. An inner member is slidably received in the outer member. There is a pin on the inner member adjacent the aperture with a free end. The pin normally spans the aperture for holding the fishing line which extends about the pin. A release device adjacent the top of the inner member is capable of being struck by a weight slidably dropped down the downrigger line to displace the inner member downwardly and move the free end of the pin across the aperture to release the fishing line. A recess member has a recess with an internal spline means and a passageway for fishing line exterior to the recess. A wedge member has a tapering portion shaped to wedge within the recess member. The tapering portion has longitudinal grooves extending along opposite sides thereof. The grooves are sufficiently large to permit the fishing line to pass freely between the wedge member and the recess member with one of the grooves fitting over the spline means when the wedge member is wedged in the recess member.

14 Claims, 9 Drawing Figures

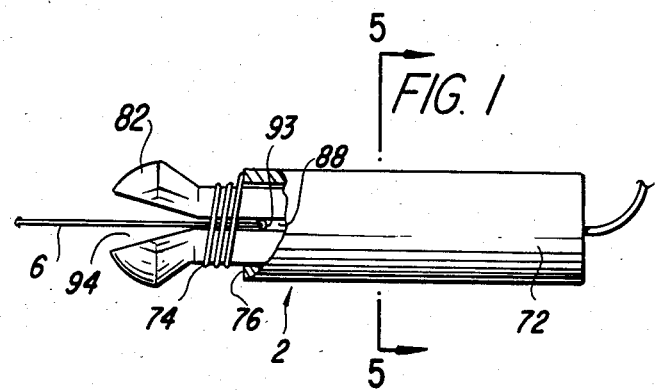
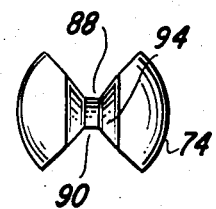
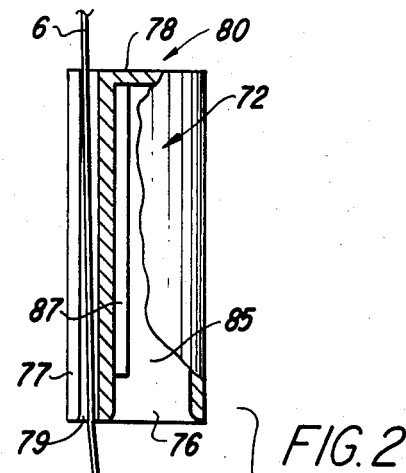
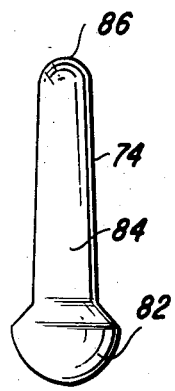
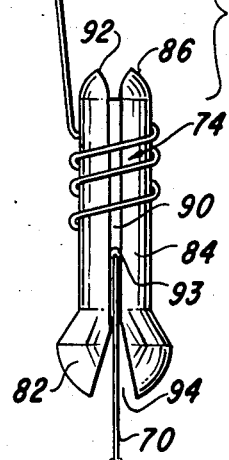

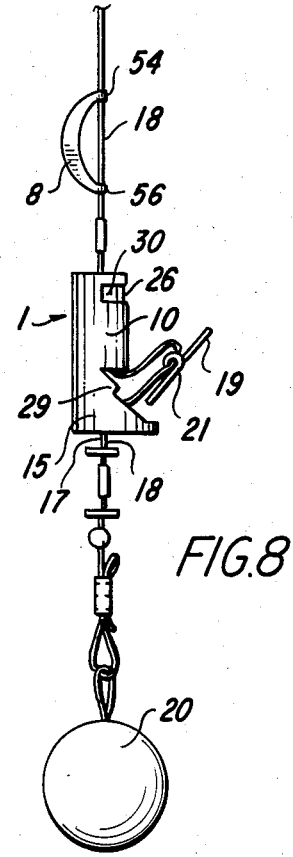
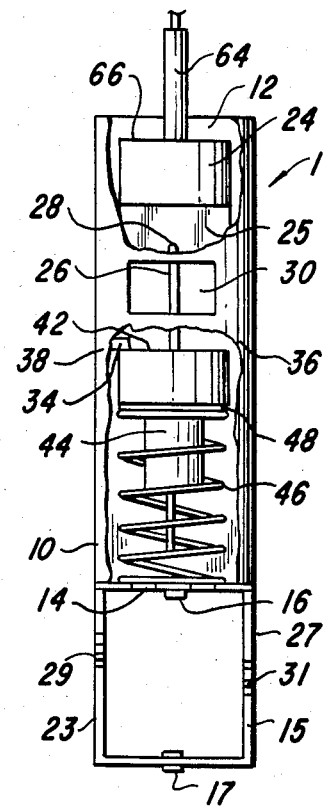
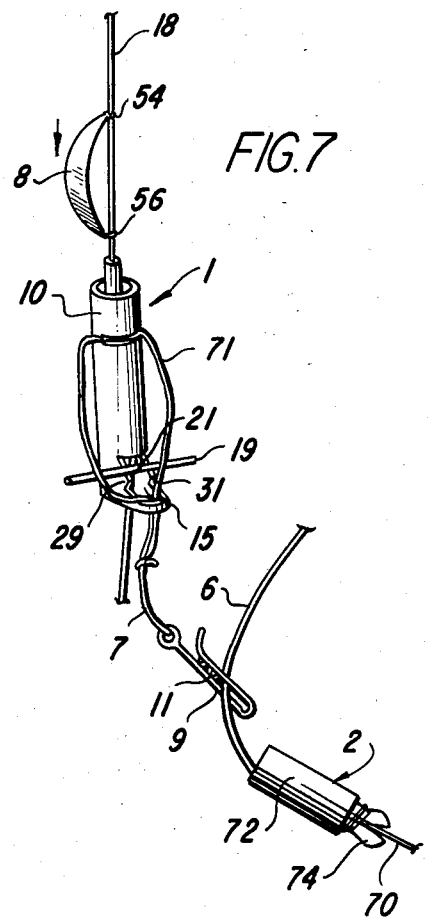
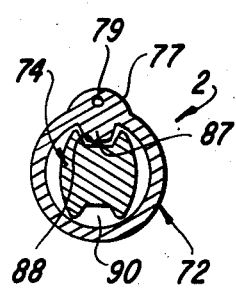

DEEP TROLLING RELEASE DEVICE

RELATED APPLICATION

This application in a continuation-in-part of my copending U.S. patent application Ser. No. 532,370, filed Sept. 15, 1983, U.S. Pat. No. 4,565,026.

BACKGROUND OF THE INVENTION

The invention relates to a deep trolling device for releasably connecting a fishing line to a downrigger line or cable.

Release devices for releasably connecting fishing lines to downrigger cables are known. Some such devices are in the shape of a recess member having a recess for receiving a wedge member. Typically the wedge member is frusto-conical in shape and the recess member is a hollow cylinder. The fishing line is wedged between the two members such that the members are forced apart to release the line when a fish strikes.

One problem associated with such earlier devices is the fact that the fishing line cannot be easily released when desired. The fishing line can only be released by pulling on the fishing line hard from above or bringing up both the downrigger line and fishing line together in stages. In addition, it is difficult to set the exact release force so that the device releases when a fish strikes, but does not release prematurely.

Earlier devices comprising a wedge member and recess member such as found in U.S. Pat. No. 3,765,118, are also disadvantageous in that the fishing line is pinched between the wedge member and the recess member. This pinching typically takes place adjacent the open end of the recess member. The fishing line is thereby weakened at this point.

SUMMARY OF THE INVENTION

According to the invention, a deep trolling device is provided for releasably connecting fishing line to a downrigger line. The device includes a hollow outer member connectable to the downrigger line and having a top and an aperture in a side thereof. An inner member is slidably received in the outer member. The inner member has a top. A pin on the inner member is adjacent the aperture in the outer member and has a free end. The pin normally spans the aperture for holding a fishing line extending about the pin. Release means adjacent the top of the inner member is capable of being struck by a weight slidably dropped down the downrigger line. The release means operatively engages the inner member to displace the inner member downwardly when the release means is struck by the weight to move the free end of the pin across the aperture in the outer member and release the fishing line.

A recess member has a recess with an internal spline means and a passageway for fishing line exterior to the recess. A wedge member has a tapering portion which tapers towards one end thereof and is shaped to wedge within the recess member. The tapering portion has longitudinal grooves extending along opposite sides thereof. The grooves are sufficiently large to permit the fishing line to pass freely between the wedge member and the recess member with one of the grooves fitting over the spline means when the wedge member is wedged in the recess member.

Preferably, the wedge member has an aperture extending through the tapering portion positioned so the aperture is within the recess adjacent the open end of the recess member when the wedge member is wedged in the recess member.

The device may include a fishing line normally extending from a fishing rod along and passing through the passageway of the recess member, then through the aperture of the wedge member. The fishing line is then looped about the tapering portion of the wedge member a sufficient number of times and to prevent slipping, and the wedge member is then inserted in the recess member.

BRIEF DESCRIPTION OF THE DRAWINGS

In the drawings:

FIG. 1 is a side elevation of a deep trolling release device including a wedge member and a recess member, showing the wedge member wedged in the recess member and the recess member partly broken away;

FIG. 2 is a side view showing the wedge member and recess member separated and with the recess member partly broken away;

FIG. 3 is a end view of the wedge member;

FIG. 4 is a side view of the wedge member;

FIG. 5 is a sectional view taken along line 5—5 of FIG. 1;

FIG. 6 is a front view of another deep trolling release device, partly broken away, including an outer cylindrical member and an inner cylindrical member;

FIG. 7 is a perspective view of the device of FIG. 6 used in combination with the device of FIGS. 1–5;

FIG. 8 is a side elevation of the device of FIG. 6 and weight attachment; and

DESCRIPTION OF THE PREFERRED EMBODIMENTS

Figure 9:
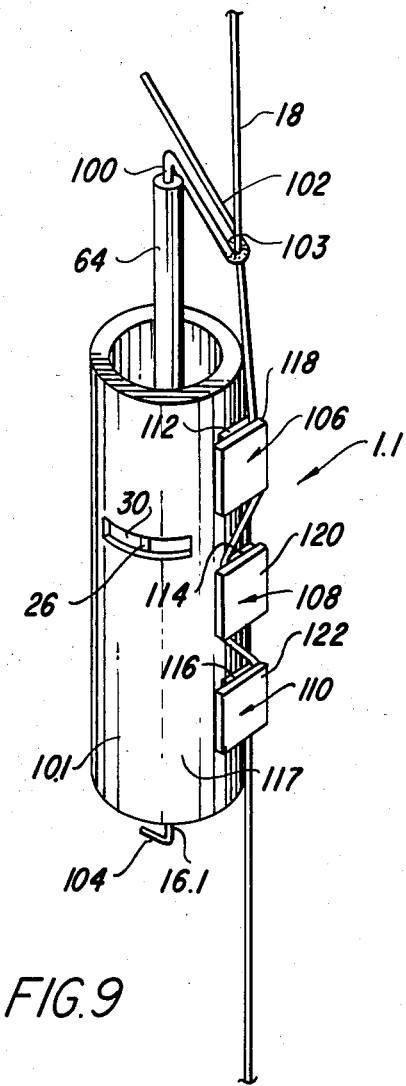
FIG. 9 is a perspective view of an alternative form of the device of FIG. 6.

Referring firstly to FIG. 7, this shows a pair of devices 1 and 2 used in combination as a release system for connecting a downrigger cable 18 and a fishing line 6. Device 1 permits the fishing line to be separated from the downrigger cable when desired by the fisherman who drops a weight 8 down the downrigger cable. Device 2 is used to maintain the lure at a desired distance behind the downrigger cable. Device 2 releases and slides to the bottom of the line when a fish strikes to permit the fishing line to be reeled in completely.

As shown in better detail in FIG. 6, device 1 includes a hollow, cylindrical outer member 10 having an open top 12 and a closed bottom 14 having a central aperture 16. The device has a bottom extension 15 with an aperture 17. Apertures 16 and 17 are sized to permit a length of downrigger cable 18 to pass freely therethrough. Downrigger weight 20, shown in FIG. 8, is connected to the bottom end of cable 18. The cable passes through a loop 21 formed in a rod 19 between apertures 16 and 17. Bottom extension 15 has spaced-apart sloped surfaces 23 and 27, shown in FIG. 6, having steps 29 and 31 which serve as detent means for engaging rod 19. The rod is pulled downwardly from the position of FIG. 7 to engage steps 29 and 31. This kinks cable 18 to keep device 1 stationary on the cable. Step 29 is slightly higher than step 31 to conform to the shape of looped rod 19.

An inner member 24 is slidably received within the outer member. A recess 25 is formed in the side of the inner member. A pin 26 is connected to the inner member and extends upwardly from the bottom of the recess. The pin 26 has a free top end 28. As best seen in FIG. 8, the pin 26 normally spans a rectangular aperture 30 in the side of outer member 10. Thus, in the normal position, the pin serves to secure loop 71 of a leash 7 to device 1 as shown in FIG. 7. A hook 9 connects line 7 to fishing line 6.

A cylindrical position 44 on the bottom of inner member 24 projects into a coil spring 46 extending between shoulder 48 of the inner member and bottom 14 of the outer member. The coil spring resiliently biases the inner member towards the top 12 of the outer member.

Device 1 is actuated by a weight 8 having wire loops 54 and 56 adjacent the top and bottom thereof. The loops freely embrace downrigger cable 18. Other weights slidably connected to the cable could be substituted.

Line 7 can be released from pin 26 whenever a fisherman desires. Weight 8 is normally held above the water. When the fisherman wishes to release the leash 7, he allows weight 8 to drop downwardly until it contacts tubing 64 which serves as a release means contacting top 66 of inner member 24. The impact of the weight striking the force transmitting device thereof causes compression of coil spring 46 and moves free end 28 of pin 26 downwardly past aperture 30 in the outer member. This releases the leash 7.

Device 2, shown in FIGS. 1–5 and 7, is normally used to maintain a certain distance behind the downrigger cable. Referring to FIG. 7, end 70 of the line 6 extends to a fish hook and lure. Loop 71 of leash 7 is held by pin 26 and so device 2 maintains the desired length of line between the downrigger line and the hook. Device 2 cannot pull through hook 9.

Referring to FIG. 2, device 2 has two parts. There is a recess member 72 and a wedge member 74. The recess member is elongated, having an open end 76. The opposite end 78 is closed. The member has a bulge 77 on one side, best seen in FIG. 5, having a passageway 79 passing from end 76 to end 78 of the member. The passageway is chamfered adjacent end 76 to prevent cutting of a line extending therefrom. The member has a hollow, cylindrical recess 85 extending from open end 76 and terminating at closed end 78. The recess has a long internal spline 87, shown in FIGS. 2 and 5, which terminates within the recess a distance from open end 76.

Device 2 also includes wedge member 74 which has a bifurcated head 82 and a tapering portion 84. Tapering portion 84 tapers towards end 86. Longitudinal grooves 88 and 90 extend along opposite sides of the tapering portion. Grooves 88 and 90 are interconnected by a groove 92 at end 86. The grooves are also connected by a deep groove 94 on head 82. Grooves 88 and 90 are sufficiently large to permit fishing line 6 to pass freely between members 72 and 74 when member 74 is wedged in member 72 as shown in FIG. 1 or FIG. 7. Thus, the line is not pinched as occurs with prior art devices. Spline 87 terminates a distance from open end 76 so as not to interfere with the line.

The user inserts the fishing line first through passageway 79 of member 72, then through aperture 93 of wedge member 74. After passing through aperture 93, the user loops the fishing line a sufficient number of times to prevent slipping typically three to five turns, about tapering portion 74 as may be observed in FIG. 2. The wedge member is rotated axially 90° from the position of FIG. 2 and inserted in the recess member. It becomes wedged with aperture 93 below open end 76 of the recess member. The line passes inwardly along one of the grooves, say groove 88, passes through apertures 93, then passes outwardly along the other groove 90. The loops of line are pushed outwardly when the wedge member is inserted. Thus it may be noted that the line is unpinched and cannot slip due to the looping about the wedge member. The spline 87 prevents relative rotation between members 72 and 74 and consequent untwisting and release of the line.

When a fish pulls on end 70 of fishing line 6, wedge member 74 is pulled out of recess member 72. The loops of line unravel from the tapering portion, both the recess member and wedge member slide to the bottom of the line and the line is thus free to pull through hook 9. Because of interdigitated teeth 11, the hook and line 7 are retained on line 6. The fisherman releases the line from member 1 by dropping weight 8 in the manner described above. This is preferably done after the fish has peeled off as much line as it desires. The fisherman is then free to reel in line 6 which is no longer connected to downrigger cable 18. In the manner described, the fish has already released device 2 and thus the fisherman can completely reel in the line without the obstruction that would otherwise occur when device 2 would reach the tip of the fishing rod.

With reference to FIG. 7, the leash 7 and hook 11 could be omitted. The line 6 itself passes behind the pin in this case. The use of the leash is advantageous because it makes the rod tip more responsive if a fish strikes. It also raises the lure above the bottom if the weight is near the bottom. In practice the leash is 2–3 feet long and is shortened for illustrative purposes. The end of the leash angles upwardly in use with the hook well above device 1.

FIG. 9 shows an alternative form of the device shown in FIG. 7. Device 1.1 is the same device with the exception of some parts discussed below where the designation "0.1" is added to equivalent parts for device 1. In device 1.1, a stiff wire 100 extends longitudinally through the centre of tubing 64. An open loop portion 102 at the top of the wire extends perpendicularly from tubing 64 and forms a pocket for slidably receiving downrigger cable 18. In this case cylindrical outer member 10.1 has a plain closed bottom terminating adjacent an aperture 16.1. The wire has a right angle bend 104 below the opening to retain it in member 10.1. Three spaced-apart protrusions 106,108 and 110 extend outwardly from the cylindrical side wall 117 of member 10.1 in vertical alignment. They are rectangular in this embodiment and have smaller rectangular portions 112, 114 and 116 adjacent the cylindrical side wall 117 of the member. Larger rectangular portions 118, 120 and 122 are located on the smaller portions outwardly from the side wall. In this way a flange extends about each protrusion spaced-apart from side wall 117 to retain cable 18.

Cable 18 extends through pocket 103 of the wire and is then wrapped about the protrusions 106, 108 and 110 in a circuitous path by passing, for example, downwardly over the right side of protrusion 106, then being angled over to the left side of protrusions 108 where it extends downwardly and is angled again over to the right side of protrusion 110. From here the cable extends downwardly so as weight similar to weight 20 of FIG. 8 can be connected thereto. This embodiment offers the advantage of much quicker attachment and removal from the downrigger line with no special separate connectors required.

The wire 100 in device 1.1 need not be a stiff wire as shown. It may have a closed loop for example for embracing the downrigger cable. Alternatively, instead of extending through tubing 64, the tubing, internal member 24 shown in FIG. 6 and the wire could be connected together. In this case the wire could be flexible and have a loop formed thereon for the downrigger cable.

What is claimed is:

1. A deep trolling release device comprises:
   a first member having a top, a bottom, a recess extending from the top towards the bottom, a passageway extending from the top to the bottom outside the recess, and spline means extending along the recess in the direction between the top and the bottom, and a second member having a tapering portion which tapers towards one end thereof and is shaped to wedge within the recess, the tapering portion having longitudinal grooves extending along opposite sides thereof, the grooves being sufficiently large to permit a fishing line to pass freely between the first and second members when the second member is wedged within the recess with one of the grooves fitting over the spline means.

2. A device as claimed in claim 1, wherein the first member has a first end which is open for receiving the second member, the second member having an aperture extending through the tapering portion positioned so the aperture is within the recess when the second member is wedged in the first member.

3. A device as claimed in claim 2, wherein the first member has a second end which is closed.

4. A device as claimed in claim 3, including a fishing line passing along one of the grooves into the recess, through the aperture in the second member, passing, outwardly from the recess along another of the grooves, looping about the tapering portion of the second member a plurality of times, and then passing through the passageway in the first member from the top to the bottom thereof.

5. A device as claimed in claim 4, wherein the fishing line is looped at least three times about the tapering portion.

6. A device as claimed in claim 3, wherein the recess is a cylindrically hollowed out portion of said first member and the tapering portion is frusto-conical in shape.

7. A deep trolling device for releasably connecting a fishing line to a downrigger line, the device comprising:
   (a) a hollow outer member connectable to the downrigger line and having a top and an aperture in a side thereof;
   (b) an inner member slidably received in the outer member, the inner member having a top;
   (c) a pin on the inner member adjacent the aperture in the outer member and having a free end, the pin normally spanning the aperture for holding a connecting line extending about the pin;
   (d) release means for releasing the fishing line adjacent the top of the inner member and capable of being struck by a weight slidably dropped down the downrigger line, the release means operatively engaging the inner member to displace the inner member downwardly when the release means is struck by the weight to move the free end of the pin across the aperture in the outer member and release the connecting line;
   (e) a recess member having a recess with an internal spline means and a passageway for fishing line exterior to the recess;
   (f) a wedge member having a tapering portion which tapers towards one end thereof and is shaped to wedge within the recess member, the tapering portion having longitudinal grooves extending along opposite side thereof, the grooves being sufficiently large to permit the fishing line to pass freely between the wedge member and the recess member with one of the grooves fitting over the spline means, when the wedge member is wedged in the recess member; and
   (g) connecting means for connecting the connecting line to the fishing line towards a reel end of the fishing line from the recess member and wedge member.

8. A device as claimed in claim 7, wherein the wedge member has an aperture extending through the tapering portion so the aperture is within the recess adjacent the open end of the recess member when the wedge member is wedged in the recess member.

9. A device as claimed in claim 8, further including a fishing line normally extending along one of the grooves of the wedge member, then passing through the aperture of the recess member, extending outwardly along another of the grooves, looping about the tapering portion of the wedge member a plurality of times, then extending through the passageway.

10. A device as claimed in claim 9, further comprising resilient means between the inner member and the outer member for biasing the inner member towards the top of the outer member.

11. A deep trolling device for releasably connecting a fishing line to a downrigger line, the device comprising:
   (a) a hollow outer member having a top, a cylindrical side wall, an aperture in a side wall and a plurality of protrusions extending from the side wall about which the downrigger line can be wrapped;
   (b) an inner member slidably received in the outer member, the inner member having a top;
   (c) a pin or the inner member adjacent the aperture in the outer member and having a free end, the pin normally spanning the aperture for holding a connecting line extending about the pin; and
   (d) release means for releasing the fishing line adjacent the top of the inner member including a lateral guide member capable of receiving the fishing line and maintaining the trolling device closely aligned therewith, said release means being capable of being struck by a weight slidably dropped down the downrigger line, the release means operatively engaging the inner member to displace the inner member downwardly when the release means is struck by the weight to move the free end of the pin across the aperture in the outer member and release the connecting line.

12. A device as claimed in claim 11 wherein said lateral guide member is a loop-shaped member extending from the release means for slidably receiving the downrigger line.

13. A device as claimed in claim 12 wherein there are three said protrusions in vertical alignment when the device is positioned for use, the protrusions being spaced-apart and having enlarged outer portions for retaining the downrigger line between the outer portion and the side wall of the outer member.

14. A device as claimed in claim 12, wherein the loop-shaped member has an open loop for receiving the downrigger line.

* * * * *